United States Patent
Kang et al.

(10) Patent No.: US 11,017,205 B2
(45) Date of Patent: May 25, 2021

(54) THREE-DIMENSIONAL FINGER VEIN RECOGNITION METHOD AND SYSTEM

(71) Applicant: SOUTH CHINA UNIVERSITY OF TECHNOLOGY, Guangzhou (CN)

(72) Inventors: Wenxiong Kang, Guangzhou (CN); Hongda Liu, Guangzhou (CN); Feiqi Deng, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 4 days.

(21) Appl. No.: 16/478,959

(22) PCT Filed: Nov. 28, 2017

(86) PCT No.: PCT/CN2017/113362
§ 371 (c)(1),
(2) Date: Jul. 18, 2019

(87) PCT Pub. No.: WO2018/196371
PCT Pub. Date: Nov. 1, 2018

(65) Prior Publication Data
US 2019/0347461 A1    Nov. 14, 2019

(30) Foreign Application Priority Data

Apr. 26, 2017    (CN) .......................... 201710281130.0

(51) Int. Cl.
*G06K 9/00*    (2006.01)
*G06K 9/20*    (2006.01)

(52) U.S. Cl.
CPC ............ *G06K 9/001* (2013.01); *G06K 9/0008* (2013.01); *G06K 9/00208* (2013.01); *G06K 9/20* (2013.01);
(Continued)

(58) Field of Classification Search
CPC .. G06K 9/001; G06K 9/0008; G06K 9/00208; G06K 9/20; G06K 9/00013; G06K 9/00114; G06K 2009/2045; G06K 2009/05
See application file for complete search history.

(56) References Cited

U.S. PATENT DOCUMENTS

2006/0233427 A1* 10/2006 Hauke ................ G06K 9/00033
382/124
2008/0187208 A1* 8/2008 Shirota .............. G06K 9/00134
382/133
(Continued)

*Primary Examiner* — Stephen G Sherman
(74) *Attorney, Agent, or Firm* — JMB Davis Ben-David

(57) ABSTRACT

A three-dimensional finger vein recognition method and system, comprising the following steps: three cameras taking finger vein images from three angles to obtain three images; constructing a three-dimensional finger model according to finger contour lines; mapping two-dimensional image textures photographed by the three cameras into the three-dimensional finger model, respectively performing different processes on an overlapping region and a non-overlapping region; obtaining a three-dimensional finger vein image; and finally, performing feature extraction and matching on the three-dimensional finger vein image, to complete recognition. The method can acquire a better finger vein recognition effect, and has a higher robustness for a plurality of postures, such as finger rotation and inclination.

9 Claims, 7 Drawing Sheets

(52) U.S. Cl.
CPC ...... *G06K 9/00013* (2013.01); *G06K 9/00114* (2013.01); *G06K 2009/2045* (2013.01); *G06K 2209/05* (2013.01)

(56) References Cited

U.S. PATENT DOCUMENTS

| | | | |
|---|---|---|---|
| 2012/0293632 A1* | 11/2012 | Yukich | H04N 13/243 348/47 |
| 2017/0024601 A1* | 1/2017 | Lin | G06K 9/00087 |
| 2019/0026453 A1* | 1/2019 | Choi | G06K 9/00013 |

* cited by examiner

THREE-DIMENSIONAL FINGER VEIN RECOGNITION METHOD AND SYSTEM

CROSS-REFERENCE TO RELATED APPLICATIONS

This is the U.S. National Stage of International Patent Application No. PCT/CN2017/113362 filed Nov. 28, 2017, which was published in Chinese under PCT Article 21(2), and which in turn claims the benefit of Chinese Patent Application No. 201710281130.0 filed on Apr. 26, 2017.

TECHNICAL FIELD

The present invention relates to the field of vein recognition technologies, and in particular, to a three-dimensional finger vein recognition method and system.

BACKGROUND OF THE INVENTION

With the development of the information age, identity verification becomes increasingly important. Conventional identity verification manners can no longer fully meet people's various requirements regarding convenience, anti-spoofing, and high security during identity verification in the new age. In this case, biometric identification technologies represented by fingerprint recognition and facial recognition are gradually further researched and widely applied. Biometric identification technology is a technology of performing identity verification by using one or more biometric (for example, a fingerprint, a face, an iris, and a vein) or behavioural features (for example, a gait, and a signature) of a human. A finger vein recognition technology becomes increasingly important in the field of identity verification for its unique advantages. In the finger vein recognition technology, information about blood vessel patterns beneath finger skin are used to verify the identity of an individual. Compared with other biometric identification technologies, the unique advantages of finger vein recognition comprise: (1) A biometric of a living body is used, so that it is very difficult to forge such a biometric and high security is achieved. (2) Non-contact or weak-contact measurement may be implemented, and desirable accessibility is achieved. (3) Finger vein recognition is not easily susceptible to a scar, an oil stain, or sweat on the surface of a finger and has relatively high anti-interference performance. With the development in recent years, the research and development and the application of finger vein recognition are growing rapidly, and finger vein recognition shows great market potential.

Current vein recognition technologies generally use a monocular camera to perform two-dimensional imaging on a single side of a finger in a near-infrared light. In this imaging manner, a vein image of only the single side of the finger is acquired. Therefore, comprised vein feature information is limited. In addition, under the influence of factors such as a finger placement position, a finger placement pose (for example, rotation), and uneven exposure during the collection of a finger vein image, it is difficult to locate stable and reliable ROIs. As a result, subsequent feature extraction and matching are relatively sensitive to a rotation deviation and a displacement deviation.

However, relatively few researches have been carried out on finger vein recognition in different poses. The few existing researches comprise: using an ellipse model to extend a collected two-dimensional finger vein image to standardise a finger vein image, and then cropping an effective region to perform matching; using a circle model to extend a two-dimensional finger vein image; or, using a three-dimensional model method, in which the key is still using an ellipse model to standardise finger vein images in six different poses and then performing matching. Either physical model has mitigated to a particular degree a condition of relatively large differences between vein images of a same finger that are photographed in different poses. However, problems that still exist comprise: On one hand, a quantity of corresponding texture regions is reduced, and matching is adversely affected. On the other hand, the quality of a vein image in an edge region is usually relatively poor under the influence of imaging factors, and a recognition result is also affected. Another method is a three-dimensional imaging method based on multi-view geometry. However, during three-dimensional reconstruction in this solution, it is difficult or even impossible to find matched feature points. As a result, it is difficult to calculate depth information of all vein textures. In addition, vein textures on only a single side are collected in this method. Therefore, the problem of limited feature information still exists.

SUMMARY OF THE INVENTION

A main objective of the present invention is to overcome disadvantages and deficiencies in the prior work, and provide a three-dimensional finger vein recognition method, so that a better recognition effect can be achieved, and relatively high robustness can be achieved for various poses such as finger rotation and inclination.

Another objective of the present invention is to provide a three-dimensional finger vein recognition system based on the foregoing method, so that a better recognition effect can be achieved, and relatively high robustness can be achieved for various poses such as finger rotation and inclination.

The objectives of the present invention are implemented by using the following technical solutions:

A three-dimensional finger vein recognition method comprises the following steps:

S1, photographing, by three cameras, from three angles from evenly spaced angles to obtain three images;

S2, constructing a three-dimensional finger model according to a finger edges:

a sectional view of a finger is considered approximately as a circle S, a three-dimensional finger is divided into several sections at equal distances, a contour of each section is calculated, and the finger is modelled approximately by using a plurality of circles that have different radii and are located in different positions; and all the approximated circles are then connected in an axial direction of the finger to obtain an approximate three-dimensional finger model;

S3, after the three-dimensional finger model has been constructed, next, mapping a two-dimensional image texture photographed by the three cameras into the three-dimensional finger model, wherein an overlapping portion and a nonoverlapping portion exist between every two of the images photographed by the three cameras, an overlapping region needs to be determined first, and the overlapping region and a nonoverlapping region are then processed differently, to obtain a three-dimensional finger vein image; and S4, performing feature extraction and matching on the three-dimensional finger vein image, to eventually complete recognition.

Preferably, the three-dimensional finger is divided into 300 sections at equal distances.

Preferably, a method for calculating the contour of each section is:

1) constructing a coordinate system xOy according to projection centres $C_1$, $C_2$, $C_3$ of the three cameras: using an intersection of perpendicular bisectors of the three points as a coordinate origin O, and using the perpendicular bisector of $C_2C_3$ as a y axis to construct a Cartesian coordinate system xOy; and converting pixel coordinates on the images into the coordinate system xOy:

a distance from the origin O of the coordinate system to an imaging plane of a camera i is set as $L_0$, it is set that coordinates of a point on an image is $A(x_0,y_0)$ the point is converted onto an image $I_i$ in the coordinate system xOy, and the coordinates obtained after conversion are A'(x,y):

$$\begin{bmatrix} x \\ y \end{bmatrix} = \begin{bmatrix} \sin\theta_i & \cos\theta_i \\ -\cos\theta_i & \sin\theta_i \end{bmatrix} \begin{bmatrix} y_0 - y_m \\ L_0 \end{bmatrix}$$

wherein $\theta_i$ denotes an included angle between a ray $OC_i$ and a positive direction of an x axis, i=1, 2, 3, and $y_m$ denotes a half of an image height in a radial direction of the finger; and here, only image coordinates of upper and bottom edge points of the finger need to be converted into xOy coordinates, coordinates of an upper edge point $P_{ui}$ of the finger on an image photographed by the camera i that are obtained after conversion are denoted as $\overline{P}_{ui}(x_{ui},y_{ui})$, and coordinates of a bottom edge point $P_{bi}$ that are obtained after conversion are $\overline{P}_{bi}(x_{bi},y_{bi})$;

2) calculating parameters of a circle S:

coordinates of the projection centre of each camera are known and are denoted as $C_i(x_i,y_i)$, and equations of a straight line $C_i\overline{P}_{ui}$ and a straight line $C_i\overline{P}_{bi}$ are calculated:

$L_{ui}: y=k_{ui}x+b_{ui}$, and $L_{bi}: y=k_{bi}x+b_{bi}$;

when it is set that coordinates of the centre of the circle S are $(x_c,y_c)$ and the radius is $r_c$, distances from the centre to the straight lines are:

$$d_{ui} = \left| \frac{k_{ui}x_c - y_c + b_{ui}}{\sqrt{1+k_{ui}^2}} \right|$$

$$d_{bi} = \left| \frac{k_{bi}x_c - y_c + b_{bi}}{\sqrt{1+k_{bi}^2}} \right|$$

an optimal circle equation should satisfy the following optimization equation:

$$\min F = \sum_{i=1}^{3} (|d_{ui}^2 - r_c^2| + |d_{bi}^2 - r_c^2|)$$

the parameters $x_c,y_c,r_c$ of the circle are solved by using an optimization-problem solving algorithm.

Further, the parameters of the circle may be calculated by using a gradient-descent solving algorithm.

Further, a method for approximately solving the parameters of the circle is:

1) calculating angle bisectors of $L_{ui}$ and $L_{bi}$:

angle bisector equations of the two straight lines are $L_i$: $y=k_ix+b_i$, to obtain a system of equations:

$$\begin{cases} |k_i - k_{ui}|/(1+k_ik_{ui}) = |k_i - k_{bi}|/(1+k_ik_{bi}) \\ y_i = k_ix_i + b_i \end{cases}$$

it may be obtained from a priori knowledge that: $|k_1|>1$, $k_2>0$, and $k_3<0$, and in this way, a system of equations corresponding to each camera has a unique solution;

2) calculating centre coordinates and a radius:

according to the three angle bisector equations calculated in the previous step, every two straight lines have an intersection, and an intersection between $L_i$ and $L_j$ is denoted as, $P_{ij}(x_{ij},y_{ij})$, wherein $x_{ij}=(b_i-b_j)/(k_j-k_i)$ $y_{ij}=k_ix_{ij}+b_i$ distances from $P_{ij}$ to $L_{ui}$ and $L_{uj}$ are respectively denoted as $r_{ij}$ and $r_{ji}$, and may be calculated by using formulae for a distance from a point to a straight line, and therefore, eventual centre coordinates $S(x_c,y_c)$ and a radius $r_c$ may be calculated by using the following formulae:

$$x_c = \frac{1}{3}\sum x_{ij}$$

$$y_c = \frac{1}{3}\sum y_{ij}$$

$$r_c = \frac{1}{6}\sum_{i\neq j} r_{ij}.$$

Preferably, rectification needs to be performed before a contour of each section is calculated, so that after rectification, the three cameras have the same intrinsic parameter, main lines of sight of the three cameras are located in a same plane, and the main lines of sight are all in directions from the projection centres to the origin of a system coordinate system.

Further, a method of rectification is:

calibrating the three cameras separately by using a matlab calibration toolbox, wherein intrinsic parameters of the three cameras are respectively $K_1$, $K_2$, and $K_3$;

setting a rectification conversion formula:

$p_i'=H_iP_i$ wherein i=1, 2, 3, and $H_i$ denotes a conversion matrix from uncalibrated image coordinates $p_i$ to calibrated image coordinates $p_i'$, wherein $H_i=K\overline{R}_iR_i T K_i^{-1}$ $R_i$ denotes a rotation matrix that is from the coordinate system of camera i to the system coordinate system, before and after conversion, a position of the camera is kept unchanged, but a rotation matrix that is obtained after conversion is: $\overline{R}_i=\overrightarrow{C_iO}/|\overrightarrow{C_iO}|$, wherein coordinates of a point $C_i$ are $(x_i,y_i,0)$, and O is the origin of the system coordinate system; and obtaining the calibrated image coordinates $p_i'$ by substitution into the rectification conversion formula.

Preferably, a method for mapping a two-dimensional image texture photographed by the three cameras into the three-dimensional finger model is:

1) calculating an overlapping region first, three-dimensional finger model coordinates are converted into image coordinates; a camera i is used as an example; for each circle model, an image corresponding to one camera is a vertical line segment, that is, the line segment has the same vertical coordinate in the image, the vertical coordinate is set to v, v should be determined to be the same as a vertical coordinate of a position of a corresponding edge point during construction of the circle model, and in this way, only a horizontal coordinate u is considered; this is the case of converting two-dimensional coordinates into one-dimensional coordinates, and the following coordinate conversion formula may be obtained:

$$v_a \begin{bmatrix} u \\ 1 \end{bmatrix} = \begin{bmatrix} -\sin\theta_i & \cos\theta_i \\ -\cos\theta_i & -\sin\theta_i \end{bmatrix} \left( \begin{bmatrix} x' \\ y' \end{bmatrix} - L_0 \begin{bmatrix} \sin\theta_i \\ \cos\theta_i \end{bmatrix} \right) + \begin{bmatrix} u_m \\ 0 \end{bmatrix}$$

wherein u is a horizontal coordinate on a corresponding image, $v_a$ is a proportion coefficient and has an effect of setting a vertical coordinate of a calculation result to 1, $\theta_i$ denotes an included angle between an orientation of the camera i and a positive direction of a horizontal axis in a system coordinate system, $L_0$ is a distance from a centre of an imaging plane of the camera i to the system coordinate system, $u_m$ is a horizontal coordinate of an imaging centre, and (x',y') is a point on a circle and satisfies the following equation:

$$[x'-x_c, y'-y_c][x'-x_c, y'-y_c]^T = r_c^2$$

wherein it is set that a photographing range of the camera i in a circle model is $Area_i$, boundary points of an arc $Area_i$ correspond to edge points of the finger in the photographed image, and therefore also correspond to, coordinate points on the circle, that is, boundary points $U_i$ and $B_i$ of a target function max(min) F=u; coordinates of the boundary points $U_i$ and $B_i$ are calculated by using the foregoing two formulae as constraint conditions; and in this way, a boundary of a photographing range of each camera can be calculated;

next, an arc corresponding to the camera is determined, it is specified here that a clockwise direction is a positive direction, a starting end and a finishing end of a regional range are defined, an arc is determined according to an orientation in which a camera is placed in an actual system, and the photographing range of the camera i should correspond to $\overset{\frown}{_iU_i}$;

after the photographing range of each camera is calculated, an overlapping region $\overset{\frown}{_iU_j}$ between images photographed by every two cameras may be obtained;

2) texture mapping for a region in which only a single camera performs photographing, only an image photographed by the camera is used for mapping, that is, image coordinates corresponding to a point on an arc are calculated according to a coordinate conversion formula, and a pixel grayscale value at the coordinates is used as a pixel grayscale value of the point on the arc;

for an overlapping region $\overset{\frown}{_2U_3}$ between two cameras, a Gaussian image fusion method is used to determine a grayscale value of a three-dimensional pixel point, and the method is:

for a region in which a camera 2 and a camera 3 perform photographing, a photographing region of the camera 2 is $\overset{\frown}{_2U_2}$, a photographing region of the camera 3 is $\overset{\frown}{_3U_3}$, and an overlapping region of the two regions is $\overset{\frown}{_2U_3}$; for a point (x',y') in the overlapping region, the formula is used to calculate image coordinates of the point that separately correspond to the camera 2 and the camera 3, grayscale values $I_2(u_2,v_2)$ and $I_3(u_3,v_3)$ of two image coordinate points are obtained, and eventually the following formula is used to calculate a grayscale value of the point (x',y') in the overlapping region:

$$I(x',y') = \omega_2 I_2(u_2,v_2) + \omega_3 I_3(u_3,v_3)$$

wherein ω is a Gaussian weight, and if an overlapping portion is at a finishing end of a current region, a weight value is calculated according to the formula g(p), or if an overlapping portion is at a starting end of a current region, a weight value is calculated according to the formula 1−g(p), wherein $$g(p) = \frac{1}{\sqrt{2\pi}\,\sigma} e^{-\frac{p^2}{2\sigma^2}}$$

3σ=a length of the overlapping portion;

images photographed by any two cameras are processed according to a similar method, so that a texture mapping problem of a single circle model is resolved; and for all approximate circles in the three-dimensional finger model, grayscale values of three-dimensional coordinate points are calculated separately according to the foregoing methods, to eventually obtain the three-dimensional finger vein image.

Preferably, two three-dimensional finger vein texture images that need to be matched are aligned first, and are separately unfolded into two-dimensional images, and matching of a three-dimensional finger vein texture is then completed by using feature extraction and matching of the unfolded two-dimensional images.

Specifically, steps of unfolding into a two-dimensional image are:

first, mapping a three-dimensional finger vein texture onto a cylinder having a given size, wherein this is equivalent to that each circle is normalized into a circle having a fixed size, for a circle model, equal-angle sampling is performed starting from a first point in a horizontal direction, a total of N points are sampled, and each point is mapped to a point at a same angle on a circle at a corresponding position of the cylinder:

$$I(r \times \cos(\tilde{x}\alpha), r \times \sin(\tilde{x}\alpha), z) = I(r_c \times \cos(\tilde{x}\alpha) + x_c, r_c \times \sin(\tilde{x}\alpha) + y_c, z)$$

wherein α=2π/N, $\tilde{x}$=1, 2, 3, . . . , N, z=1, 2, . . . , M are z-axis coordinates, r is the radius of the given cylinder, $r_c$ is the radius of a circle model during three-dimensional finger vein reconstruction, and $(x_c, y_c)$ is the centre position of the circle model; and a vein texture can be mapped onto the side of the cylinder after all circle models are processed; and the side of the cylinder is cut open along one generatrix according to the following Formula 1, and is unfolded into a two-dimensional image having a size M×N:

$$I(\tilde{x}, \tilde{y}) = I(r \times \cos(\tilde{x}\alpha - \beta), r \times \sin(\tilde{x}\alpha - \beta), \tilde{y})$$

wherein β denotes the azimuth at which the generatrix is located.

Further, when a cylinder corresponding to a template image and a cylinder corresponding to an image to be matched are unfolded into two-dimensional images, if positions of generatrices do not correspond, there is an offset problem between the two unfolded images, and to ensure that corresponding positions can be kept basically unchanged after samples that belong to a same type of object are unfolded into two-dimensional images, the following method is provided to align three-dimensional finger vein images, that is, a value of β is determined:

substituting $\beta=k\beta_0$ into the foregoing formula, wherein $\beta_0$ is a search step size and is $\pi/15$, $0 \le k < 2\pi/\beta_0$, and k is an integer; and capturing a two-dimensional image $I_{test}^k$ test whose size is $M_0 \times N_0$ from a two-dimensional image unfolded from a three-dimensional image to be matched, wherein $M_0 = \frac{1}{3} \times M$, and $N_0 = \frac{1}{3} \times N$;

here, specifying that a rotational angle of a template three-dimensional finger image is β=0, that is, specifying that a position of a generatrix for unfolding into a two-dimensional image is a reference orientation, and obtaining a sub image block of a two-dimensional image unfolded from a three-dimensional finger vein template image:

$0 \le \tilde{x} < M_0$ $0 \le \tilde{y} < N_0$ wherein a two-dimensional image $I_{template}$ whose size is $M_0 \times N_0$ is obtained, so as to find, from the three-dimensional image to be matched, an image block matching the two-dimensional image, to align the three-dimensional image to be matched and a template three-dimensional image;

then calculating similarity degrees between all two-dimensional images corresponding to k and a template block $I_{template}$:

$$\max_{k \in [0, 2\pi/\beta_0)} J(k) = \text{corr}(I_{template}, I_{test}^k)$$

wherein the foregoing expression corr denotes calculation of a correlation between two images, and $k\beta_0$ corresponding to a maximum correlation is used as a rotational angle of a sample to be matched;

after the azimuth angle of the generatrix is calculated by using this method, then unfolding the three-dimensional finger vein image to be matched into a two-dimensional texture image according to Formula 1, wherein the two-dimensional texture image is aligned with a template two-dimensional image.

Specifically, steps of feature extraction and matching of a two-dimensional image are:

using an LBP operator to extract a structural feature of a vein texture, and then using a Manhattan distance calculation method to perform feature matching:

a texture feature vector of a template sample is denoted as $F_1 = [f_1^{(1)}, f_1^{(2)}, \ldots, f_1^{(m)}]$, a texture feature vector of a sample to be matched is denoted as $F_2 = [f_2^{(1)}, f_2^{(2)}, \ldots, f_2^{(m)}]$, and a Manhattan distance between the two texture features is:

$$D = \sum_{i=1}^{m} |f_1^{(i)} - f_2^{(i)}|$$

In a decision stage, a single threshold method is used as follows:

$$\begin{cases} \text{if } D > T \ F_1 \text{ and } F_2 \text{ do not match} \\ \text{else } D \le T \ F_1 \text{ and } F_2 \text{ match} \end{cases}$$

When the calculated distance exceeds a given threshold T, it is considered that the two samples have a relatively similarity degree, and it is determined that the two samples are not objects of a same type; otherwise, it is considered that the two samples have a high similarity degree, and it is determined that the two samples are objects of a same type.

A system based on the foregoing three-dimensional finger vein recognition method comprises a host and a client, wherein the client comprises a light source control module and an image collection module, the light source control module comprises a microprocessor, a driving circuit, and a near-infrared light source that are sequentially connected, and the image collection module comprises a camera for collecting an image; software for implementing three-dimensional finger vein reconstruction and recognition is installed on the host, and the host implements transfer of a light-source brightness control signal with the microprocessor of the light source control module and implements transmission of video data with the camera; and the client is responsible for controlling the intensity of the near-infrared light source and collecting and transmitting image information, and the host is responsible for performing processing, three-dimensional reconstruction, feature extraction, and recognition on collected digital images.

Preferably, the host and the microprocessor of the light source control module implement transfer of a light source brightness control signal through a serial port, the light source control module uses the microprocessor to control the brightness of the near-infrared light source and implement that three light sources on the sides take turns to illuminate a finger.

Preferably, the host and the camera transmit video data in a USB manner, and the camera uses a near-infrared USB camera.

Preferably, the three cameras are mounted at three vertices of a equilateral triangle, the main lines of sight of the three cameras are located in a same plane and intersect with each other at 120°, and a corresponding near-infrared LED group is disposed right in front of each camera.

Preferably, the client generates a PWM signal by using a timer to control the brightness of an near-infrared LED, and a serial port interrupt is used to receive a control command sent by the host.

As compared with the prior work, the present invention has the following advantages and beneficial effects:

In the present invention, three cameras are used to photograph a finger vein image comprehensively from evenly spaced angles, a three-dimensional finger vein is reconstructed, and feature extraction and matching are performed on a three-dimensional finger vein image. A finger vein image photographed by using the three cameras comprises more feature information than that comprised in a finger vein image beneath the skin on an inner side of a finger photographed by using only one camera, and more information means more accurate determination. Compared with conventional two-dimensional finger vein recognition, the three-dimensional finger vein recognition method provided in the present invention can obtain more vein texture features to achieve a better recognition effect. In addition, the problem of recognition performance degradation caused by changes of finger poses can be further effectively overcome.

DETAILED DESCRIPTION OF THE INVENTION

Hereafter the present invention will be further described in detail in conjunction with embodiments and appended drawings, but the embodiments of the present invention are not limited thereto.

Embodiment 1

Figure 1:
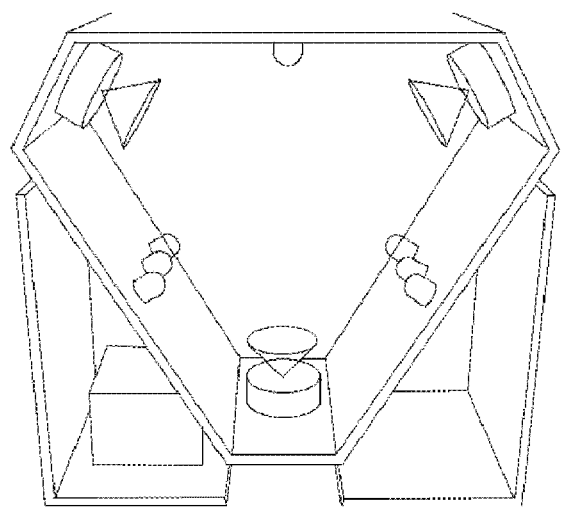
FIG. 1 is a diagram of an image collection apparatus of a three-dimensional finger vein recognition system in Embodiment 1.

As shown in FIG. 1, a three-dimensional finger vein recognition system comprises a hardware portion and a software portion. The hardware portion comprises a near-infrared image collection device. The software portion comprises a finger vein three-dimensional reconstruction and recognition algorithm in PC. The hardware device is mainly responsible for controlling the intensity of the near-infrared light source and transmitting image information. The software portion is responsible for performing processing, three-dimensional reconstruction, feature extraction, and recognition on collected digital images. Different from an existing two-dimensional finger vein recognition system, this system uses three cameras to obtain an image of all veins beneath finger skin, and extracts a three-dimensional finger vein texture feature to perform matching.

1.1 Hardware Design

Figure 2:
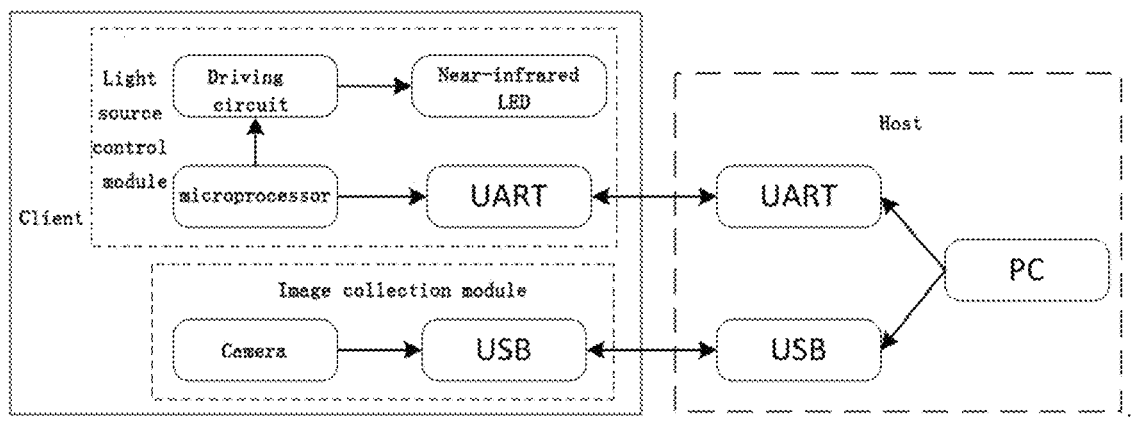
FIG. 2 is a structural diagram of hardware of a three-dimensional finger vein recognition system in Embodiment 1.

System hardware comprises a host and a client. The client comprises a light source control module and an image collection module. The light source control module uses a microcontroller to control the brightness of a near-infrared light source to implement that three light sources on the sides take turns to illuminate a finger. The image collection module uses an 850-nm near-infrared USB camera (the model is KS302D) to collect an image. The host is a PC. The PC implements transfer of a light source brightness control signal with the microcontroller by using a serial port, and performs transmission of video data with the camera in a USB manner. FIG. 1 is a schematic structural diagram of a three-dimensional finger vein image collection apparatus. The three cameras are mounted at three vertices of an equilateral triangle and are sequentially numbered. Main lines of sight of the three cameras are located in a same plane and intersect with each other at 120°. Venographic imaging uses a near-infrared light transmission manner, and corresponding near-infrared LED groups are disposed right in front of each camera. A hardware structure block diagram of the system is shown in FIG. 2.

1.2 Software Design

Figure 3:
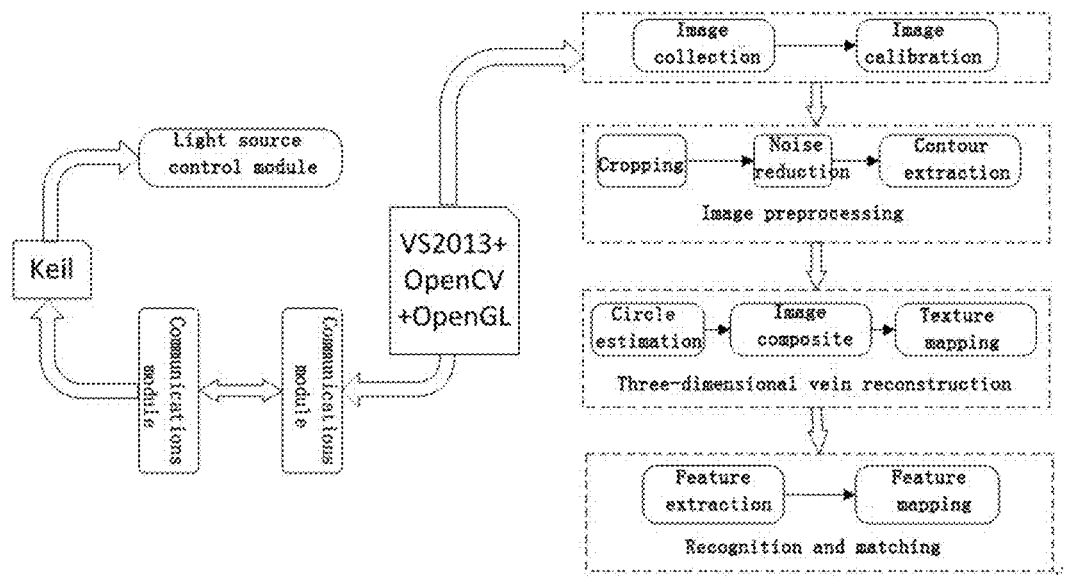
FIG. 3 is a flowchart of software of a three-dimensional finger vein recognition system in Embodiment 1.

The software portion of the system is the core of the system and is mainly responsible for system process control, image processing, and three-dimensional reconstruction and matching. The client uses Keil to develop a single-chip microcomputer control program. The host uses VS2013+OpenCV+OpneGL to develop software that integrates image processing, three-dimensional reconstruction, and feature extraction and matching. The client uses a timer to generate a PWM signal to control the brightness of a near-infrared LED, and uses a serial port interrupt to receive a control command sent by the host. The host first collects an image and controls the client to adjust the brightness of a light source and then performs a series of preprocessing operations such as cropping, denoising, and edge detection on an original image; next, uses a provided three-dimensional reconstruction algorithm to construct a three-dimensional finger model, and maps a vein texture onto the three-dimensional finger model; and eventually implements a matching function according to a feature extraction method. FIG. 3 is a system software flowchart.

Embodiment 2

By using the device in Embodiment 1, the three cameras are used to photograph a finger vein image comprehensively from evenly spaced angles, three-dimensional finger veins are reconstructed, and feature extraction and matching are performed on a three-dimensional finger vein image.

1. Reconstruct Three-Dimensional Finger Veins:

When a human finger is stretched, a vertical sectional view in an axial direction of the finger is similar to an ellipse whose eccentricity is close to 1. However, compared with an ellipse, a mathematical equation of a circle has fewer parameters, and it is relatively easy to calculate a circle. Therefore, a sectional view of a finger is considered approximately as a circle. In this case, the finger may be modelled approximately by using a plurality of circles that have different radii and are located in different positions.

Because a human finger has a relatively smooth surface, a finger edge has a relatively gentle change in an image photographed by each camera. Therefore, when coordinates of edge points are used to calculate parameters of a circle, even if corresponding points of three perspectives have some deviations, a calculation result is not severely affected. Methods for constructing a three-dimensional finger model and mapping a vein texture are described below in detail.

Figure 4:
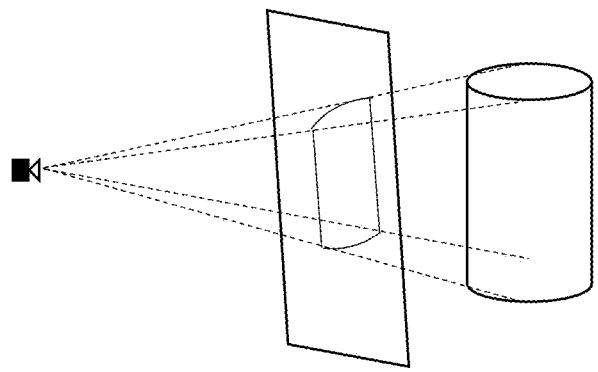
FIG. 4 is a schematic principle diagram of a pin hole model.
Figure 5:
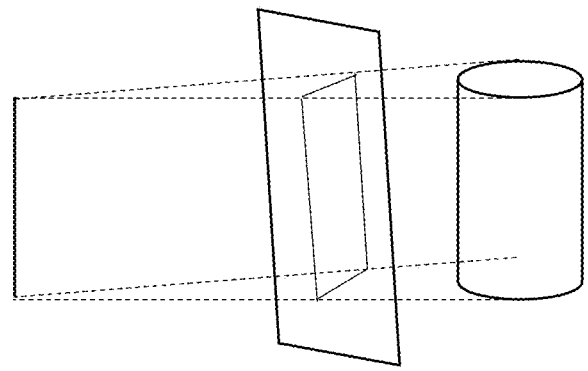
FIG. 5 is a schematic diagram of an approximation imaging model in Embodiment 2.
Figure 6:
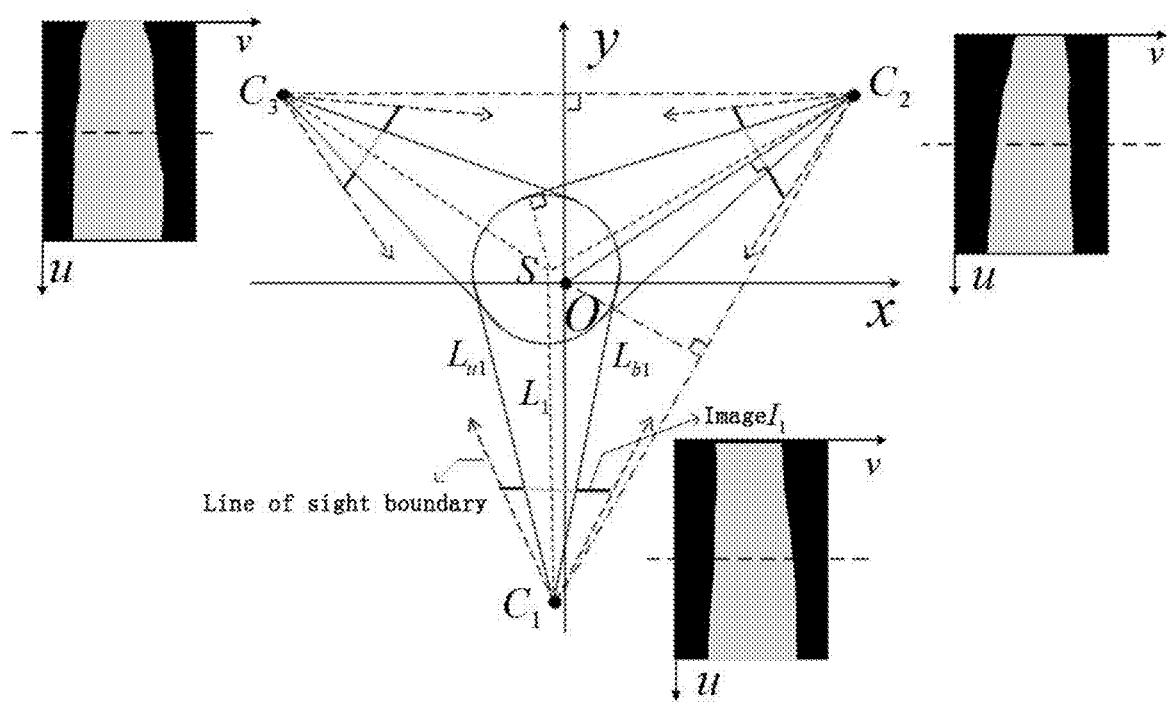
FIG. 6 is a schematic diagram of a circle approximation method in Embodiment 2.

1.1 Construct a Three-Dimensional Finger Model 1.1.1 Mathematical Model in an Ideal State First, because the cameras used in the system are nearly distortionless, imaging models of the cameras may be approximated by using a pinhole model, as shown in FIG. 4. By combining characteristics of the imaging structure of this system, CMOS cameras having a same model and same parameters are selected to be used. When a finger is placed, the axis of the finger is located at a central position of the three cameras, and the axis of the finger is approximately perpendicular to a plane formed by projection centres of the three cameras. Therefore, a method for constructing a three-dimensional finger model according to a finger edge is provided, a problem that pixel points at which the cameras perform sampling in an axial direction of the finger are not even may be not considered, and an approximate three-dimensional structure shown in FIG. 5 is used for approximate expression. In this case, for each section, a geometrical model approximated by using a circle is shown in FIG. 6. The size and position of a circle are solved by using the following two steps.

Step 1: Convert pixel coordinates on the images into the coordinate system xOy shown in FIG. 6.

First, relative positions of projection centres $C_1$, $C_2$, $C_3$ of the three cameras are known. An intersection of perpendicular bisectors of the three points is used as a coordinate origin O. The perpendicular bisector of $C_2C_3$ is used as a y axis to construct a Cartesian coordinate system xOy. A distance from origin O of the coordinate system to an imaging plane of a camera i is set as $L_0$ (the three cameras correspond to the same $L_0$). It is set that coordinates of a point on an image is $A(x_0,y_0)$. The point is converted onto an image xOy in the coordinate system $I_i$. The coordinates obtained after conversion are $A'(x,y)$:

$$\begin{bmatrix} x \\ y \end{bmatrix} = \begin{bmatrix} \sin\theta_i & \cos\theta_i \\ -\cos\theta_i & \sin\theta_i \end{bmatrix} \begin{bmatrix} y_0 - y_m \\ L_0 \end{bmatrix}, \quad (1)$$

wherein $\theta_i$ denotes an included angle between a ray $OC_i$ and a positive direction of an x axis, i=1, 2, 3, the case is the same below, and $y_m$ denotes a half of an image height in a radial direction of the finger.

Here, only image coordinates of contour edge points of the finger need to be converted into xOy coordinates. Coordinates of an upper edge point $P_{ui}$ of the finger on an image photographed by the camera i that are obtained after conversion are denoted as $\overline{P}_{ui}(x_{ui},y_{ui})$, and coordinates of a bottom edge point $P_{bi}$ that are obtained after conversion are $\overline{P}_{bi}(x_{bi},y_{bi})$.

Step 2: Calculate Parameters of a Circle

Because coordinates of the projection centre of each camera are known and are denoted as $C_i(x_i,y_i)$, it is easy to calculate equations of a straight line $C_i\overline{P}_{ui}$ and a straight line $C_i\overline{P}_{bi}$. For ease of description, a slope intercept form is generally used. During actual calculation, the presence of a slope needs to be discussed for the case a camera 1, and details are not described herein.

$$L_{ui}: y = k_{ui}x + b_{ui} \quad (2), \text{ and}$$

$$L_{bi}: y = k_{bi}x + b_{bi} \quad (3), \text{ and}$$

When it is set that coordinates of the centre of the circle S are $(x_c,y_c)$ and the radius is $r_c$, distances from the centre to the straight lines are:

$$d_{ui} = \left| \frac{k_{ui}x_c - y_c + b_{ui}}{\sqrt{1 + k_{ui}^2}} \right|, \text{ and} \quad (4)$$

$$d_{bi} = \left| \frac{k_{bi}x_c - y_c + b_{bi}}{\sqrt{1 + k_{bi}^2}} \right|, \quad (5)$$

and

An optimal circle equation should satisfy the following optimization equation:

$$\min F = \sum_{i=1}^{3} (|d_{ui}^2 - r_c^2| + |d_{bi}^2 - r_c^2|). \quad (6)$$

The significance of this optimization problem lies in that the calculated circle can be tangent to straight lines $L_{ui}, L_{bi}$; as much as possible. During calculation, because the equations of the straights line are solved, that is, $k_{ui}$ and $b_{ui}$ are known quantities. The Formulae (4) and (5) of distances are substituted into the Formula (6) of optimization, $d_{ui}$ and $d_{bi}$ are eliminated to obtain that F is actually an equation about $x_c, y_c, r_c$. The parameters of the circle may be calculated by using a gradient-descent solving algorithm or by using other optimization-problem solving algorithm. However, this method requires a large amount of calculation, and a globally optimal solution can not necessarily be calculated. Another relatively simple method is then provided instead. A result calculated by using the method is not necessarily an optimal solution but a requirement is satisfied. It is noted that in an ideal case, an angle bisector of $L_{ui}$ and $L_{bi}$ is a straight line that passes through the centre of the circle. In this way, an intersection of angle bisectors may be calculated to obtain coordinates of the centre, and the radius of the circle are further calculated. A specific calculation method is as follows:

(1) Calculate angle bisectors:

angle bisector equations of the two straight lines are $L_i$: $y=k_ix+b_i$, to obtain a system of equations:

$$\begin{cases} |k_i - k_{ui}|/(1 + k_ik_{ui}) = |k_i - k_{bi}|/(1 + k_ik_{bi}) \\ y_i = k_ix_i + b_i \end{cases}. \quad (7)$$

In addition, it may be obtained from a priori knowledge that: $|k_1|>1$, $k_2>0$, and $k_3<0$, and in this way, a system of equations corresponding to each camera has a unique solution.

(2) Calculate centre coordinates and radius:

according to the three angle bisector equations calculated in the previous step, every two straight lines have an intersection, and an intersection between $L_i$ and $L_j$ is denoted as $P_{ij}(x_{ij},y_{ij})$, wherein $$x_{ij}=(b_i-b_j)/(k_i-k_j) \quad (8), \text{ and}$$

$$y_{ij}=k_ix_{ij}+b_i \quad (9); \text{ and}$$

distances from $P_{ij}$ to $L_{ui}$ and $L_{uj}$ are respectively denoted as $r_{ij}$ and $r_{ji}$, and may be calculated by using formulae for a distance from a point to a straight line, and therefore, eventual centre coordinates $S(x_c,y_c)$ and a radius $r_c$ may be calculated by using the following Formulae (10) to (12):

$$x_c = \frac{1}{3}\sum x_{ij}, \quad (10)$$

$$y_c = \frac{1}{3}\sum y_{ij}, \text{ and} \quad (11)$$

$$r_c = \frac{1}{6}\sum_{i \neq j} r_{ij}. \quad (12)$$

Here, a circle has been used to approximately represent a contour of a section of a finger in an axial direction. A three-dimensional finger is divided at equal distances into several (300 herein) sections at equal distances. A contour of each section is calculated. All the approximated circles are then connected in an axial direction of the finger to obtain an approximate three-dimensional finger model. However, under the influence of factors such as differences in manufacturing processes of cameras and the lack of an ultra-precise positioning method during hardware mounting. It usually cannot be ensured that a hardware structure is consistent with an ideal model, and therefore, some rectification processing generally needs to be performed for the system.

1.1.2 Rectification Method for Changing a Common State to an Ideal State

The objective of rectification is that after rectification, the three cameras have the same intrinsic parameter, main lines of sight of the three cameras are located in a same plane, and the main lines of sight are all in directions from the projection centres to the origin of a system coordinate system. A rectification algorithm provide herein comprises the following three steps:

(1) Camera calibration

The three cameras are calibrated separately by using a matlab calibration toolbox. Intrinsic parameters of the three cameras are respectively $K_1$, $K_2$, and $K_3$.

The cameras are calibrated two by two to obtain relative position parameters $R_{ij}$ and $t_{ij}$, wherein i=1, 2; j=2, 3; i≠j, and $R_{ij}$ denotes a rotation matrix that is from a photographing centre of a camera j to a photographing centre of a camera i, and $t_{ij}$ denotes an offset matrix of the camera j with respect to the camera i:

$$t_{ij} = \begin{bmatrix} x_t \\ y_t \\ z_t \end{bmatrix}_{ij}, \text{ and} \tag{13}$$

$$R_{ij} = \begin{bmatrix} \cos\theta & \sin\theta & 0 \\ -\sin\theta & \cos\theta & 0 \\ 0 & 0 & 1 \end{bmatrix}\begin{bmatrix} 1 & 0 & 0 \\ 0 & \cos\psi & \sin\psi \\ 0 & -\sin\psi & \cos\psi \end{bmatrix}\begin{bmatrix} \cos\phi & 0 & -\sin\phi \\ 0 & 1 & 0 \\ \sin\phi & 0 & \cos\phi \end{bmatrix},$$

wherein

θ is a rotational angle around a z axis, ψ is a rotational angle around a y axis, φ is a rotational angle around a rotating axis, and the x axis, the y axis, and the z axis are coordinates axes of the system coordinate system.

(2) Construct a system coordinate system

Figure 7:
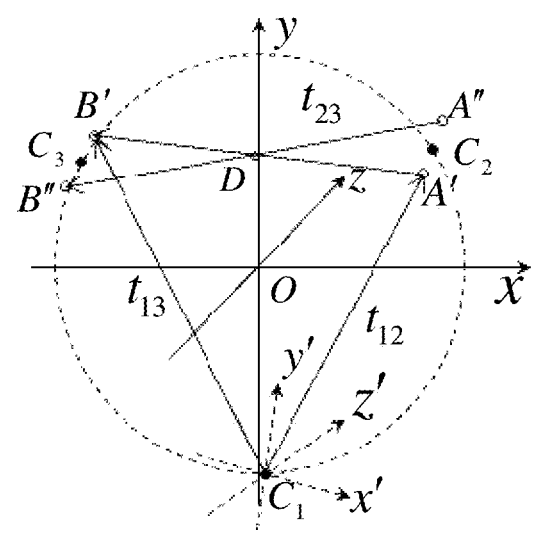
FIG. 7 is a schematic diagram of constructing a system coordinate system in Embodiment 2.

Theoretically, the vectors $t_{12}$, $t_{13}$, and $t_{23}$ are coplanar, but are very likely not coplanar in a result after rectification calculation of cameras. A following method is used to establish position relationships among three photographing centres:

As shown in FIG. 7, a coordinate system $C_1 x'y'z'$ of the camera 1 is first used as a reference. A' and B' are determined by using $t_{12}$ and $t_{13}$, and a midpoint D thereof may be obtained. A vector $t_{23}$ is translated to enable a midpoint thereof to pass through the point D. In this way, a start point A" and an end point B" of the translated vector $t_{23}$ are obtained. A midpoint of A'A" is denoted as $C_2$, and a midpoint of B'B" is denoted as $C_3$. Eventually, a plane $C_1 C_2 C_3$ formed by the projection centres of the three cameras is used an xy plane, an angle bisector intersection of $C_1 C_2 C_3$ is used as the coordinate origin O, and an angle bisector of $C_2 C_3$ is used as an x axis, so as to construct a coordinate system. As shown in FIG. 7, a translation matrix $t_s$ is from $C_1 x'y'z'$ to a coordinate system Oxyz and a rotation matrix $R_s$ can be easily calculated. Therefore, the system coordinate system can be constructed.

(3) Rectification:

setting a rectification conversion formula:

$$p_i' = H_i p_i \tag{14},$$

wherein i=1, 2, 3, and $H_i$ denotes a conversion matrix from uncalibrated image coordinates $p_i$ to calibrated image coordinates $p_i'$.

It is assumed that a space coordinate is P. A projection formula before rectification is:

$$p_i = K_i \begin{bmatrix} R_i & t_i \\ 0 & 1 \end{bmatrix} P, \tag{15}$$

wherein $R_i$ denotes a rotation matrix that is from the coordinate system of camera i to the system coordinate system, before and after conversion, a position of the camera is kept unchanged, but a rotation matrix that is obtained after conversion is: $\overline{R}_i = \overrightarrow{C_i O}/|\overrightarrow{C_i O}|$, wherein coordinates of a point $C_i$ are $(x_i, y_i)$, and O is the origin of the system coordinate system; in this way, a projection formula is obtained after conversion:

$$p_i' = K \begin{bmatrix} \overline{R}_i & t_i \\ 0 & 1 \end{bmatrix} P, \tag{16}$$

and it is solved that:

$$H_i = K \overline{R}_i R_i^T K_i^{-1} \tag{17}.$$

Figure 8:
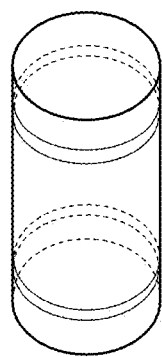
FIG. 8 is a schematic diagram of a boundary calibration object in Embodiment 2.

Here, the system model is already equivalent to an ideal model, and a three-dimensional reconstruction algorithm in an ideal model may be used to construct a three-dimensional model of a finger. It should be noted that for the determination of corresponding positions of edge points, considering that generally, fingers of adults are not greatly different, a cylinder having a diameter similar to that of a finger of an ordinary person is therefore used as a calibration object. As shown in FIG. 8, several circles are marked on the calibration object, and circles are used to mark positions of points corresponding to three views at imaging positions of the three cameras.

2.2 Vein Texture Mapping

After the three-dimensional finger model has been constructed, next, a two-dimensional image texture photographed by the three cameras is mapped into the three-dimensional finger model. As may be found from FIG. 6, an overlapping portion and a nonoverlapping portion exist between every two of the images photographed by the three cameras. Different processing methods are used for the two cases. Therefore, an overlapping region needs to be determined first, and the overlapping region and the nonoverlapping portion are then processed differently. A texture mapping method of only a single circle model needs to be researched, and the texture mapping method may be used for all circle models by way of analogy, to complete texture mapping of the three-dimensional finger.

(1) Calculate an overlapping region

Figure 9:
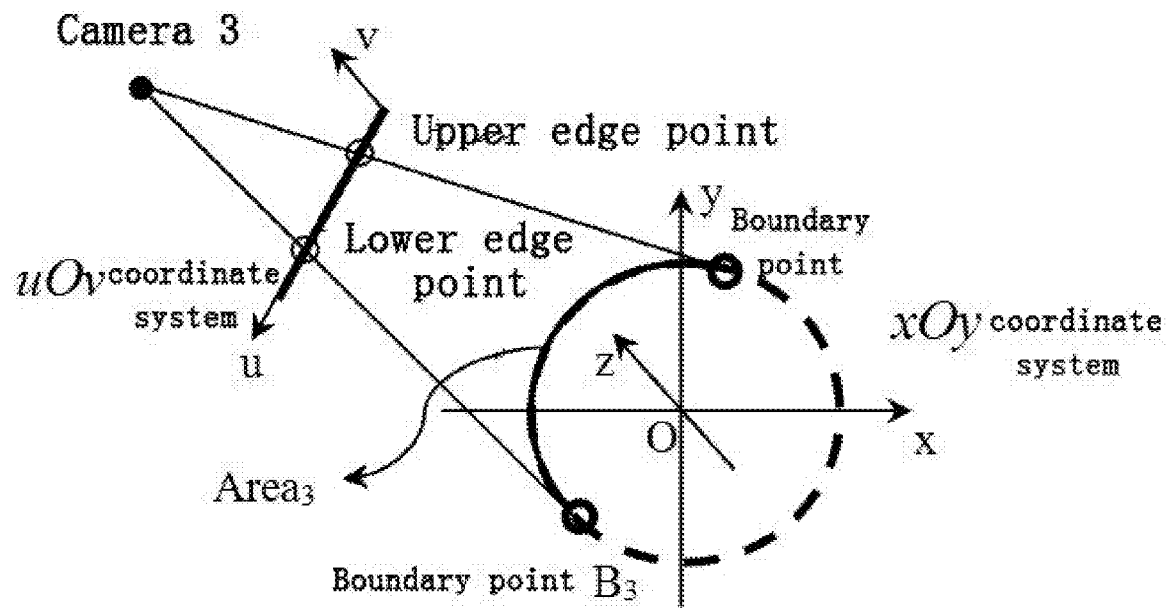
FIG. 9 is a schematic diagram of a photographing range of a single camera in Embodiment 2.

First, system coordinates are converted into image coordinates. As shown in FIG. 9, a camera 3 is used as an example. For each circle model, an image corresponding to one camera is a vertical line segment, that is, the line segment has the same vertical coordinate in the image. The vertical coordinate is set to v. v should be determined to be the same as a vertical coordinate of a position of a corresponding edge point during construction of the circle model. In this case, only a horizontal coordinate u is considered. This is the case of converting two-dimensional coordinates into one-dimensional coordinates, and the following Formula (18) may be obtained:

$$v_a \begin{bmatrix} u \\ 1 \end{bmatrix} = \begin{bmatrix} -\sin\theta_i & \cos\theta_i \\ -\cos\theta_i & -\sin\theta_i \end{bmatrix} \left( \begin{bmatrix} x' \\ y' \end{bmatrix} - L_0 \begin{bmatrix} \sin\theta_i \\ \cos\theta_i \end{bmatrix} \right) + \begin{bmatrix} u_m \\ 0 \end{bmatrix}, \quad (18)$$

wherein u is a horizontal coordinate on a corresponding image, $v_a$ is a proportion coefficient and has an effect of setting a vertical coordinate of a calculation result to 1, $\theta_i$ denotes an included angle between an orientation of the camera i in a system coordinate system and a positive direction of a horizontal axis, $L_0$ is a distance from a centre of an imaging plane of the camera i to the system coordinate system, $u_m$ is a horizontal coordinate of an imaging centre, and (x',y') is a point on a circle and satisfies the following equation (19):

$$[x'-x_c, y'-y_c][x'-x_c, y'-y_c]^T = r_c^2 \quad (19),$$

it is set that a photographing range of the camera i in a circle model is Area$_i$, boundary points (that is, boundary points of an arc Area$_i$) thereof correspond to edge points of the finger in the photographed image, and therefore also correspond to coordinate points (boundary points U$_i$ and B$_i$) on a circle of a target function max(min) F=u Formula (18) and Formula (19) are used as constraint conditions, and boundary point coordinates U$_i$ and B$_i$ are easily calculated by using a gradient-descent method. The two coordinate points may also be directly calculated according to a method in which a straight line is tangent to a circle. In this way, a boundary of a photographing range of each camera can be calculated.

Next, an arc corresponding to the camera is determined. It is specified here that a clockwise direction is a positive direction. A starting end and a finishing end of a regional range are defined. An arc is determined according to an orientation in which a camera is placed in an actual system. For example, the photographing range of the camera 3 in FIG. 9 should correspond to $\stackrel{\frown}{_3U_3}$.

After the photographing range of each camera is calculated, an overlapping region between images photographed by every two cameras is very obvious. For example, assuming that a range corresponding to a camera 2 (for a position of the camera 2, refer to FIG. 6) is $\stackrel{\frown}{_2U_2}$, in this case, a photographing overlapping region of the camera 2 and the camera 3 corresponds to $\stackrel{\frown}{_2U_3}$.

(2) Texture mapping

Next, how to map a texture of a two-dimensional image into a three-dimensional finger model is discussed. Similarly, a processing method in only one circle model needs to be discussed.

Figure 10:
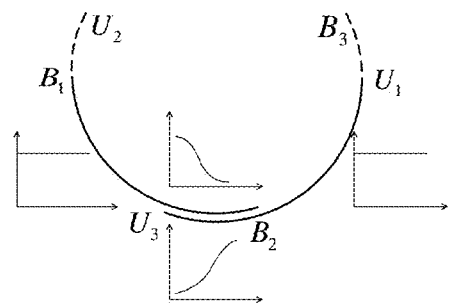
FIG. 10 is a schematic diagram of texture mapping in Embodiment 2.

As shown in FIG. 10, the region in which the camera 2 and the camera 3 perform photographing is still used as an example. A photographing region of the camera 2 is $\stackrel{\frown}{_2U_2}$. A photographing region of the camera 3 is $\stackrel{\frown}{_3U_3}$. An overlapping region of the two regions is $\stackrel{\frown}{_2U_3}$. For a region in which only a single camera performs photographing (for example, $\stackrel{\frown}{_3B_1}$ is a region in which only the camera 2 performs photographing), only an image photographed by the camera is used for mapping, that is, image coordinates corresponding to a point on an arc are calculated according to Formula (18), and a pixel grayscale value at the coordinates is used as a pixel grayscale value of the point on the arc; for the overlapping region $\stackrel{\frown}{_2U_3}$ between two cameras, a Gaussian image fusion method is used to determine a grayscale value of a three-dimensional pixel point, the method is: for a point (x',y') in the overlapping region, using Formula (18) to calculate image coordinates of the point that separately correspond to the camera 2 and the camera 3, to obtain grayscale values $I_2(u_2,v_2)$ and $I_3(u_3,v_3)$ of two image coordinate points, and eventually using the following Formula (20) to calculate a grayscale value of the point (x',y') in the overlapping region:

$$I(x',y') = \omega_2 I_2(u_2,v_2) + \omega_3 I_3(u_3,v_3) \quad (20),$$

wherein ω is a Gaussian weight, and if an overlapping portion is at a finishing end of a current region, a weight value is calculated according to the formula g(p), or if an overlapping portion is at a starting end of a current region, a weight value is calculated according to the formula 1−g(p), wherein $$g(p) = \frac{1}{\sqrt{2\pi}\,\sigma} e^{-\frac{p^2}{2\sigma^2}}. \quad (21)$$

3σ=a length of the overlapping portion. Images photographed by any two cameras are processed according to a similar method, so that a texture mapping problem of a single circle model is resolved. For all approximate circles in the three-dimensional finger model, grayscale values of three-dimensional coordinate points are calculated separately according to the foregoing methods, to eventually obtain the three-dimensional finger vein image.

3. Feature Extraction and Matching of a Three-Dimensional Finger Vein Image

There are a lot of researches on three-dimensional biometrics in the field of face and fingerprint recognition. Feature extraction of a three-dimensional image may be performed by using the following two concepts. In one concept, feature points are extracted from three-dimensional coordinates to form a feature vector. For example, in a literature, in a fingerprint recognition feature extraction algorithm, a two-dimensional minutiae concept is extended to three dimensions, and distances between minutiae in two samples are calculated to obtain a matching score between the two samples. In the other concept, special conversion is performed on a three-dimensional image to obtain a two-dimensional image, and an existing two-dimensional image feature extraction method is then used to perform feature extraction. For example, in a literature, a three-dimensional fingerprint image is mapped onto a cylinder, and is then unfolded into a two-dimensional image for subsequent processing. After a feature vector is acquired, in a sample matching method, a function for measuring a distance between feature descriptors is defined to calculate a distance value between samples. A distance calculation method is, for example, a Manhattan distance calculation method, an Euclidean distance calculation method, and a Mahalanobis distance calculation method. A single threshold method, a nearest neighbour method, and the like are then used to make an eventual matching decision.

Figure 11:
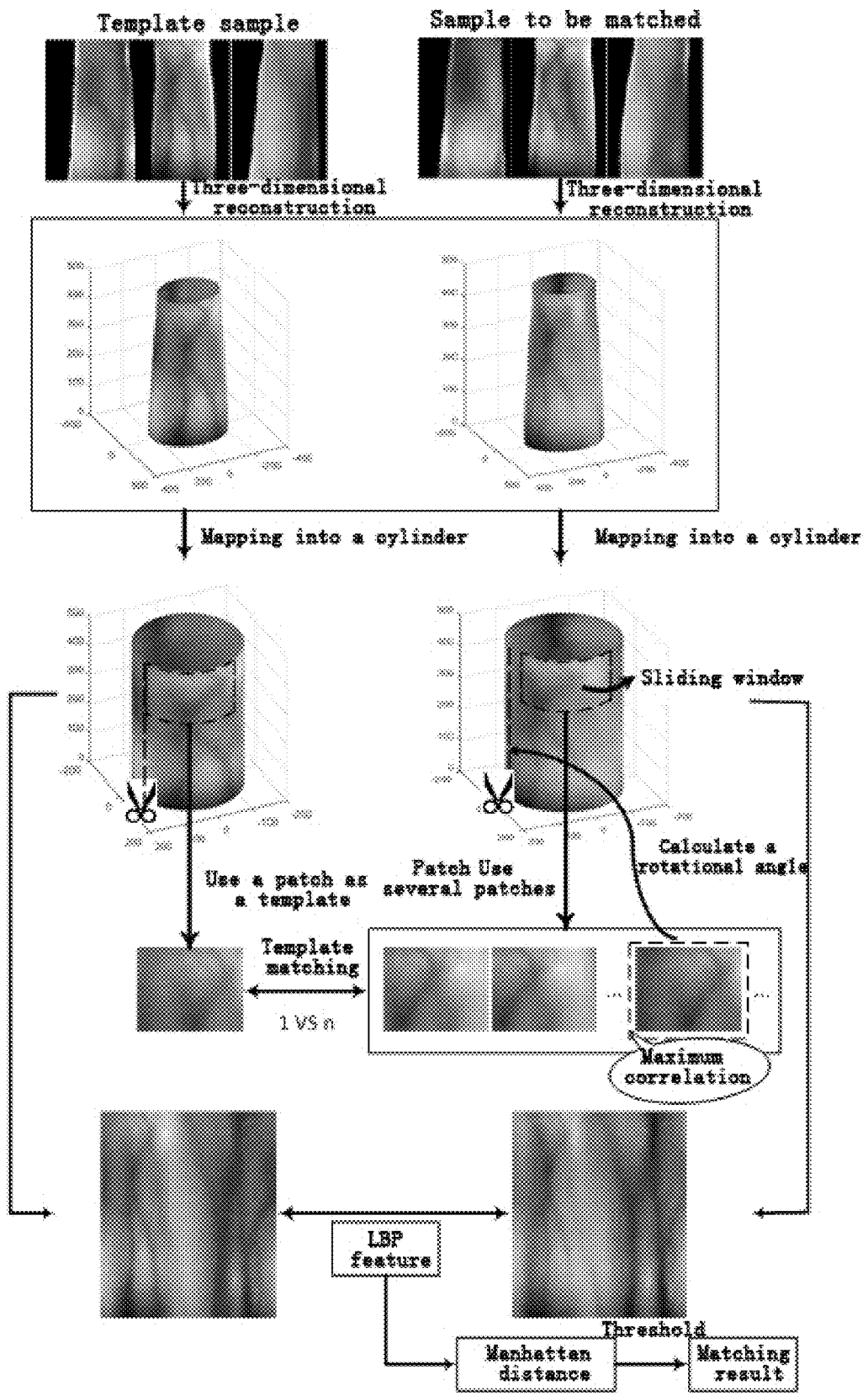
FIG. 11 is a schematic diagram of a process of performing feature extraction and feature matching on a three-dimensional finger vein in Embodiment 2.

FIG. 11 is a flowchart of a method for extracting and matching a three-dimensional finger vein feature provided in an embodiment. First, collected three two-dimensional images of template samples and three two-dimensional images of samples to be matched are used to generate a three-dimensional image of a finger vein by using the foregoing method for reconstructing a three-dimensional finger vein. Because there are no excessive constraints on the placement of a finger, generally, a particular axial rotation deviation may exist between two samples. For this problem, in the method used in this embodiment, two three-dimensional finger vein texture images that need to be matched are aligned first, and are separately unfolded into two-dimensional images, and matching of a three-dimensional finger vein texture is then completed by using feature extraction and matching of the unfolded two-dimensional images. Specific description is as follows.

3.1 Feature Extraction

It is well known that a cylinder can be cut open along one generatrix and unfolded into a rectangle. A three-dimensional structure of a human finger is approximate to that of a cylinder model. If three-dimensional finger skin veins are unfolded into a two-dimensional image, three-dimensional finger veins may be first mapped onto one cylinder and is then unfolded into a two-dimensional image.

First, a three-dimensional finger vein texture is mapped onto a cylinder having a given size. This is equivalent to that each circle is normalized into a circle having a fixed size. For a circle model, equal-angle sampling is performed starting from a first point in a horizontal direction. A total of N points are sampled. Each point is mapped to a point at a same angle on a circle at a corresponding position of the cylinder:

$$I(r\cos(\tilde{x}\alpha), r\sin(\tilde{x}\alpha), z) = I(r\cos(\tilde{x}\alpha) + x_c, r_c \times \sin(\tilde{x}\alpha) + y_c, z) \quad (22)$$

$\alpha = 2\pi/N$, $\tilde{x} = 1, 2, 3, \ldots, N$, and $z = 1, 2, \ldots, M$ are z-axis coordinates, r is the radius of the given cylinder, $r_c$ is the radius of a circle model during three-dimensional finger vein reconstruction, and $(x_c, y_c)$ is the centre position of the circle model. A vein texture can be mapped onto the side of the cylinder after all circle models are processed. Subsequently, the side of the cylinder is cut open along one generatrix according to Formula (23), and is unfolded into a two-dimensional image having a size M×N:

$$I(\tilde{x}, \tilde{y}) = I(r\cos(\tilde{x}\alpha - \beta), r\sin(\tilde{x}\alpha - \beta), \tilde{y}) \quad (23)$$

β denotes the azimuth at which the generatrix is located, and the meanings of other symbols are the same as those in Formula (22). When a cylinder corresponding to a template image and a cylinder corresponding to an image to be matched are unfolded into two-dimensional images, if positions of generatrices do not correspond, there is an offset problem between the two unfolded images, to ensure that corresponding positions can be kept basically unchanged after samples that belong to a same type of object are unfolded into two-dimensional images, the following method is provided to align three-dimensional finger vein images (that is, to determine a value of β):

here, specifying that a rotational angle of a template three-dimensional finger image is β=0, that is, specifying that a position of a generatrix for unfolding into a two-dimensional image is a reference orientation, and obtaining a sub image block of a two-dimensional image unfolded from a three-dimensional finger vein template image:

$0 \leq \tilde{x} < M_0$ $0 \leq \tilde{y} < N_0$ wherein a two-dimensional image $I_{template}$ whose size is $M_0 \times N_0$ is obtained, wherein $M_0 = \frac{1}{3} \times M$, and $N_0 = \frac{1}{3} \times N$ so as to find, from the three-dimensional image to be matched, an image block matching the two-dimensional image, to align the three-dimensional image to be matched and a template three-dimensional image. $\beta = k/\beta_0$ (wherein $\beta_0$ is a search step size and is $\pi/15$, $0 \leq k < 2\pi/\beta_0$, and k is an integer) is substituted into Formula (23). Similarly, a two-dimensional image $I_{test}^k$ whose size is $M_0 \times N_0$ is captured from a two-dimensional image unfolded from a three-dimensional image to be matched, and similarity degrees between all two-dimensional images corresponding to k and a template block $I_{template}$ are then calculated:

$$\max_{k \in [0, 2\pi/\beta_0)} J(k) = \text{corr}(I_{template}, I_{test}^k). \quad (24)$$

The foregoing expression corr denotes calculation of a correlation between two images, and $k\beta_0$ corresponding to a maximum correlation is used as a rotational angle of a sample to be matched. After the azimuth angle of the generatrix is calculated by using this method, a three-dimensional finger vein image to be matched is then unfolded into a two-dimensional texture image according to Formula (23), and the two-dimensional texture image is aligned with a template two-dimensional image.

After the three-dimensional finger vein image is unfolded into the two-dimensional image, a feature extraction algorithm of a two-dimensional image may be used to extract features. Due to illumination changes, finger deformations, noise interference, and the like, detailed features acquired from a vein image is not very stable, and a minutiae feature does not have high robustness against a finger offset. In comparison, structural features of vein patterns have relatively high robustness against influence factors such as noise interference, illumination changes, and finger deformations. Therefore, a simple and efficient LBP operator[1] is used to extract a structural feature of a vein texture.

3.2 Feature Matching

In the field of mode recognition, several measurement manners may be used to calculate a distance between two samples. Here, a Manhattan distance calculation method that has a lowest calculation complexity is used, and is also the simplest template matching method. A texture feature vector of a template sample is denoted as $F_1 = [f_1^{(1)}, f_1^{(2)}, \ldots, f_1^{(m)}]$, a texture feature vector of a sample to be matched is denoted as $F_2 = [f_2^{(1)}, f_2^{(2)}, \ldots, f_2^{(m)}]$, and a Manhattan distance between the two texture features is:

$$D = \sum_{i=1}^{m} |f_1^{(i)} - f_2^{(i)}|. \quad (25)$$

In a decision stage, a single threshold method is used. When a calculated distance exceeds a given threshold T, it is considered that the two samples have a relatively low similarity degree, and it is determined that the two samples are not objects of a same type. Otherwise, it is considered that the two samples have a high similarity degree, and it is determined that the two samples are objects of a same type.

$$\begin{cases} \text{if} & D > T \quad F_1 \text{ and } F_2 \text{ do not match} \\ \text{else} & D \leq T \quad F_1 \text{ and } F_2 \text{ match} \end{cases} \quad (26)$$

Figure 12:
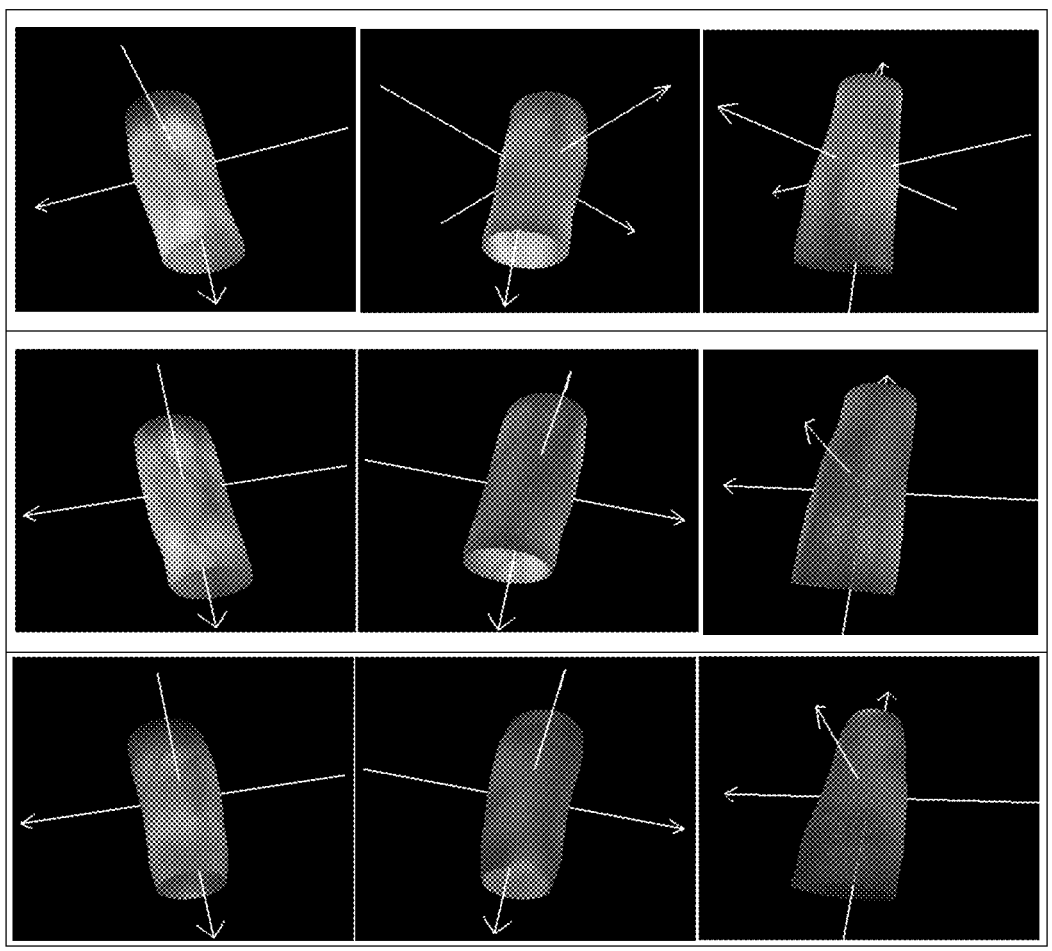
FIG. 12 is a diagram of a three-dimensional finger vein in Embodiment 2.

The three-dimensional finger vein imaging system provided in Embodiment 1 is used to collect a comprehensive finger skin vein image. The circle approximation method provided in Embodiment 2 is used to construct a three-dimensional finger model. A two-dimensional texture is mapped onto the three-dimensional finger model. An obtained three-dimensional finger image is shown in FIG. 12. Each row in FIG. 12 shows observed images of a same finger from different perspectives. Here, three-dimensional finger vein reconstruction effects of a total of three different fingers are presented. It may be seen that a three-dimensional finger vein model reconstructed by using the method in Embodiment 2 is highly realistic. A size, a bending degree, and the like of a finger all conform to the actual cases. In terms of a vein texture, the distribution of skin veins of a human finger is basically restored.

Eleven volunteers are recruited for collection for finger vein image data. To ensure the friendliness of the collection manner, no excessive requirements are specified for the volunteers. A volunteer may place a finger on an apparatus in a relatively natural state during data collection. For each volunteer, data of the index fingers and middle fingers of both hands are collected. Image collection is performed four times for each finger. Images from three perspectives of a total of forty-four fingers are used as test data. Then, by using the method provided in this embodiment, feature extraction and matching tests of three-dimensional finger vein images are performed. To describe the effectiveness of the method, results of the method are compared with results of two-dimensional vein image recognition. To ensure adequate fairness and effectiveness, two-dimensional vein images collected by the camera 1 are chosen to perform tests of two-dimensional vein image recognition. Similar to a camera in a conventional two-dimensional finger vein imaging system, the camera 1 is also located below the skin on an inner side of a finger. Test results are shown in FIG. 13.

Figure 13:
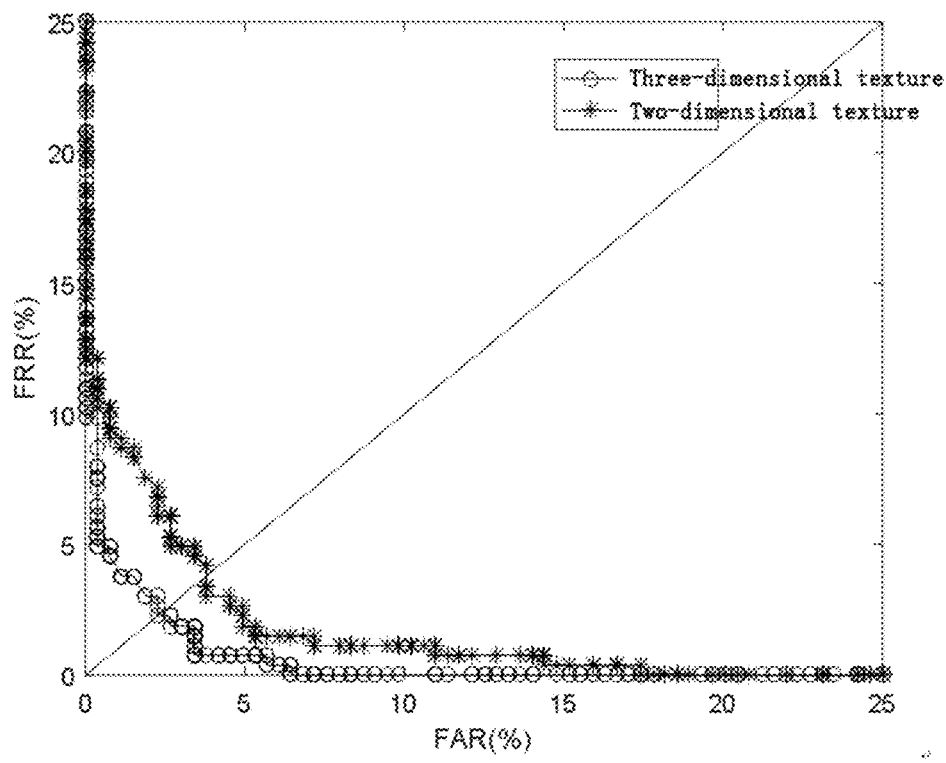
FIG. 13 is an equal error rate curve of a 2D method and a 3D method using LBP.
Figure 14:
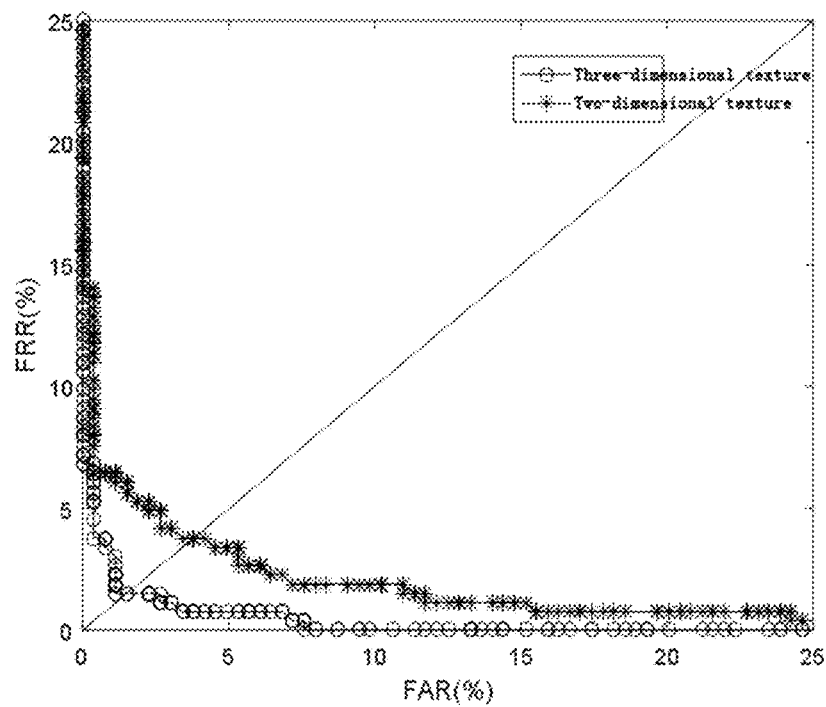
FIG. 14 is an equal error rate curve of a 2D method and a 3D method using HOG.

An LBP operator is used to extract a texture feature in FIG. 13. It can be seen from FIG. 13 that an effect of recognition using a three-dimensional finger vein texture feature is better than that of conventional recognition using a two-dimensional finger vein texture feature. A finger vein image photographed by using three cameras in the system in Embodiment 1 comprises more feature information than that comprised in a finger vein image that is of the skin on the inner side of a finger and is photographed by only one camera, and more information means more accurate determination. In addition, a HOG operator is further used to extract a texture feature for tests. Results are shown in FIG. 14. It may be found that the same conclusion can still be reached. The three-dimensional method provided in this embodiment can achieve a better matching result, and the effectiveness of the method is further verified.

In terms of an equal error rate, as shown in Table 1, an equal error rate of matching using a three-dimensional solution reaches 2.273%) (the equal error rate reaches 1.515% when a HOG operator is used). The result of the three-dimensional solution has an obvious improved effect as compared with an equal error rate of 4.167% (the equal error rate is 3.788% when a HOG operator is used) of existing matching using a two-dimensional finger vein image.

TABLE 1

Equal error rates of different methods

|  | LBP | HOG |
|---|---|---|
| 2D texture | 4.167 | 3.788 |
| 3D texture | 2.273 | 1.515 |

In conclusion, Embodiment 1 and Embodiment 2 provide a brand new three-dimensional finger vein recognition system, and three cameras are used to photograph a comprehensive image of veins beneath finger skin. According to structural characteristics of hardware, a method for fitting a finger section line by using a circle is provided to construct a three-dimensional finger model. In addition, two-dimensional finger veins photographed from three perspectives are mapped into the three-dimensional finger model. A method of feature extraction of a three-dimensional finger vein texture is provided. An identity verification system based on three-dimensional finger vein data is completely implemented. Test results show that as compared with a conventional two-dimensional finger vein recognition system, the three-dimensional finger vein recognition system provided in the embodiments can obtain more vein texture features and achieve a better recognition effect. In addition, the problem of recognition performance degradation caused by changes of finger poses can be further effectively overcome.

REFERENCE

[1] Ojala T, Pietikainen M, Harwood D. A comparative study of texture measures with classification based on featured distributions [J]. Pattern recognition, 1996, 29(1): 51-59.

The foregoing embodiments are preferred implementations of the present invention. However, the implementations of the present invention are not limited to the foregoing embodiments. Any other changes, modifications, replacements, combinations, and simplifications made without departing from the spirit, essence, and principle of the present invention shall all be equivalent replacements, and all fall within the protection scope of the present invention.

The invention claimed is:

1. A three-dimensional finger vein recognition method, characterised by comprising the following steps:
    S1, photographing, by three cameras, from three evenly spaced angles to obtain three images;
    S2, constructing a three-dimensional finger model according to the finger edges:
    a sectional view of a finger is considered approximately as a circle S, a three-dimensional finger is divided into several sections at equal distances, a contour of each section is calculated, and the finger is modelled approximately by using a plurality of circles that have different radii and are located in different positions; and all the approximated circles are then connected in an axial direction of the finger to obtain an approximate three-dimensional finger model;
    S3, after the three-dimensional finger model has been constructed, next, mapping a two-dimensional image texture photographed by the three cameras into the three-dimensional finger model, wherein an overlapping portion and a nonoverlapping portion exist between every two of the images photographed by the three cameras, an overlapping region needs to be determined first, and the overlapping region and a nonoverlapping region are then processed differently, to obtain a three-dimensional finger vein image; and S4, performing feature extraction and matching on the three-dimensional finger vein image, to eventually complete recognition;

wherein a method for calculating the contour of each section comprises:

1) constructing a coordinate system xOy according to projection centres $C_1$, $C_2$, $C_3$ of the three cameras: using an intersection of perpendicular bisectors of the three points as a coordinate origin O, and using the perpendicular bisector of $C_2C_3$ as a y axis to construct a Cartesian coordinate system xOy; and converting pixel coordinates on the images into the coordinate system xOy:

a distance from the origin O of the coordinate system to an imaging plane of a camera i is set as $L_0$, it is set that coordinates of a point on an image is $A(x_0,y_0)$, the point is converted onto an image $I_i$ in the coordinate system xOy, and the coordinates obtained after conversion are $A'(x,y)$:

$$\begin{bmatrix} x \\ y \end{bmatrix} = \begin{bmatrix} \sin\theta_i & \cos\theta_i \\ -\cos\theta_i & \sin\theta_i \end{bmatrix} \begin{bmatrix} y_0 - y_m \\ L_0 \end{bmatrix}$$

wherein $\theta_i$ denotes an included angle between a ray $OC_i$ and a positive direction of an x axis, i=1, 2, 3, and $y_m$ denotes a half of an image height in a radial direction of the finger; and here, only image coordinates of upper and bottom edge points of the finger need to be converted into xOy coordinates, coordinates of an upper edge point $P_{ui}$ of the finger on an image photographed by the camera i that are obtained after conversion are denoted as $\overline{P}_{ui}(x_{ui},y_{ui})$, and coordinates of a bottom edge point $P_{bi}$ that are obtained after conversion are $\overline{P}_{bi}(x_{ui},y_{ui})$;

2) calculating parameters of a circle S:

coordinates of the projection centre of each camera are known and are denoted as $C_i(x_i,y_i)$, and equations of a straight line $C_i\overline{P}_{ui}$ and a straight line $C_i\overline{P}_{bi}$ are calculated:

$L_{ui}: y=k_{ui}x+b_{ui}$, and $L_{bi}: y=k_{bi}x+b_{bi}$; wherein when it is set that coordinates of the centre of the circle S are $(x_c,y_c)$ and the radius is $r_c$, distances from the centre to the straight lines are:

$$d_{ui} = \left| \frac{k_{ui}x_c - y_c + b_{ui}}{\sqrt{1+k_{ui}^2}} \right|$$

$$d_{bi} = \left| \frac{k_{bi}x_c - y_c + b_{bi}}{\sqrt{1+k_{bi}^2}} \right|$$

an optimal circle equation should satisfy the following optimization equation:

$$\min F = \sum_{i=1}^{3} (|d_{ui}^2 - r_c^2| + |d_{bi}^2 - r_c^2|)$$

the parameters $x_c$, $y_c$, $r_c$ of the circle are solved by using a gradient-descent solving algorithm or by using other optimization-problem solving algorithm.

2. The three-dimensional finger vein recognition method according to claim 1, wherein an approximation method for solving the parameters of the circle comprises:

1) calculating angle bisectors of $L_{ui}$ and $L_{bi}$:

angle bisector equations of the two straight lines are $L_i$: $y=k_ix+b_i$, to obtain a system of equations:

$$\begin{cases} |k_i - k_{ui}|/(1+k_ik_{ui}) = |k_i - k_{bi}|/(1+k_ik_{bi}) \\ y_i = k_ix_i + b_i \end{cases}$$

it may be obtained from a priori knowledge that: $|k_1|>1$, $k_2>0$, and $k_3<0$, and in this way, a system of equations corresponding to each camera has a unique solution;

2) calculating centre coordinates and a radius:

according to the three angle bisector equations calculated in the previous step, every two straight lines have an intersection, and an intersection between $L_i$ and $L_j$ is denoted as $P_{ij}(x_{ij},y_{ij})$, wherein $x_{ij}=(b_i-b_j)/(k_i-k_j)$ $y_{ij}=k_ix_{ij}+b_i$ distances from $P_{ij}$ to $L_{ui}$ and $L_{uj}$ are respectively denoted as $r_{ij}$ and $r_{ji}$, and may be calculated by using formulae for a distance from a point to a straight line, and therefore, eventual centre coordinates $S(x_c,y_c)$ and a radius $r_c$ may be calculated by using the following formulae:

$$x_c = \frac{1}{3}\sum x_{ij}$$

$$y_c = \frac{1}{3}\sum y_{ij}$$

$$r_c = \frac{1}{6}\sum_{i \neq j} r_{ij}.$$

3. The three-dimensional finger vein recognition method according to claim 1, wherein calibration is performed before a contour of each section is calculated, so that after calibration, the three cameras have the same intrinsic parameter, main lines of sight of the three cameras are located in a same plane, and the main lines of sight are all in directions from the projection centres to the origin of a system coordinate system.

4. The three-dimensional finger vein recognition method according to claim 3, wherein a method of calibration comprises:

calibrating the three cameras separately by using a matlab calibration toolbox, wherein intrinsic parameters of the three cameras are respectively $K_1$, $K_2$, and $K_3$;

setting a calibration conversion formula:

$p_i'=H_ip_i$ wherein i=1, 2, 3, and $H_i$ denotes a conversion matrix from uncalibrated image coordinates $p_i$ to calibrated image coordinates $p_i'$, wherein $H_i=K\overline{R}_i R_i^T K_i^{-1}$ $R_i$ denotes a rotation matrix that is from the coordinate system of camera i to the system coordinate system, before and after conversion, a position of the camera is kept unchanged, but a rotation matrix that is obtained after conversion is: $\overrightarrow{R_i} = \overrightarrow{C_iO}/|\overrightarrow{C_iO}|$, wherein coordinates of a point $C_i$ are $(x_i,y_i)$, and O is the origin of the system coordinate system; and obtaining the calibrated image coordinates $p_i'$ by substitution into the calibration conversion formula.

5. The three-dimensional finger vein recognition method according to claim 1, wherein a method for mapping a two-dimensional image texture photographed by the three cameras into the three-dimensional finger model comprises:

1) calculating an overlapping region first, three-dimensional finger model coordinates are converted into image coordinates; a camera i is used as an example; for each circle model, an image corresponding to one camera is a vertical line segment, that is, the line segment has the same vertical coordinate in the image, the vertical coordinate is set to v, v should be determined to be the same as a vertical coordinate of a position of a corresponding edge point during construction of the circle model, and in this way, only a horizontal coordinate u is considered; this is the case of converting two-dimensional coordinates into one-dimensional coordinates, and the following coordinate conversion formula may be obtained:

$$v_a \begin{bmatrix} u \\ 1 \end{bmatrix} = \begin{bmatrix} -\sin\theta_i & \cos\theta_i \\ -\cos\theta_i & -\sin\theta_i \end{bmatrix} \left( \begin{bmatrix} x' \\ y' \end{bmatrix} - L_0 \begin{bmatrix} \sin\theta_i \\ \cos\theta_i \end{bmatrix} \right) + \begin{bmatrix} u_m \\ 0 \end{bmatrix}$$

wherein u is a horizontal coordinate on a corresponding image, $v_a$ is a proportion coefficient and has an effect of setting a vertical coordinate of a calculation result to 1, $\theta_i$ denotes an included angle between an orientation of the camera i and a positive direction of a horizontal axis in a system coordinate system, $L_0$ is a distance from a centre of an imaging plane of the camera i to the system coordinate system, $u_m$ is a horizontal coordinate of an imaging centre, and $(x',y')$ is a point on a circle and satisfies the following equation:

$$[x'-x_c, y'-y_c][x'-x_c, y'-y_c]^T = r_c^2$$

wherein it is set that a photographing range of the camera i in a circle model is $Area_i$, boundary points of an arc $Area_i$ correspond to edge points of the finger in the photographed image, and therefore also correspond to, coordinate points on the circle, that is, boundary points $U_i$ and $B_i$ of a target function max(min) F=u; coordinates of the boundary points $U_i$ and $B_i$ are calculated by using the foregoing two formulae as constraint conditions; and in this way, a boundary of a photographing range of each camera can be calculated;

next, an arc corresponding to the camera is determined, it is specified here that a clockwise direction is a positive direction, a starting end and a finishing end of a regional range are defined, an arc is determined according to an orientation in which a camera is placed in an actual system, and the photographing range of the camera i should correspond to $B_iU_i$;

after the photographing range of each camera is calculated, an overlapping region $B_iU_j$ between images photographed by every two cameras may be obtained;

2) texture mapping for a region in which only a single camera performs photographing, only an image photographed by the camera is used for mapping, that is, image coordinates corresponding to a point on an arc are calculated according to a coordinate conversion formula, and a pixel grayscale value at the coordinates is used as a pixel grayscale value of the point on the arc;

for an overlapping region $B_2U_3$ between two cameras, a Gaussian image fusion method is used to determine a grayscale value of a three-dimensional pixel point, and the method is:

for a region in which a camera 2 and a camera 3 perform photographing, a photographing region of the camera 2 is $B_2U_2$, a photographing region of the camera 3 is $B_3U_3$, and an overlapping region of the two regions is $B_2U_3$; for a point $(x',y')$ in the overlapping region, the formula is used to calculate image coordinates of the point that separately correspond to the camera 2 and the camera 3, grayscale values $I_2(u_2,v_2)$ and $I_3(u_3,v_3)$ of two image coordinate points are obtained, and eventually the following formula is used to calculate a grayscale value of the point $(x',y')$ in the overlapping region:

$$I(x',y') = \omega_2 I_2(u_2,v_2) + \omega_3 I_3(u_3,v_3)$$

wherein ω is a Gaussian weight, and if an overlapping portion is at a finishing end of a current region, a weight value is calculated according to the formula g(P), or if an overlapping portion is at a starting end of a current region, a weight value is calculated according to the formula 1−g(p), wherein $$g(p) = \frac{1}{\sqrt{2\pi}\sigma} e^{-\frac{p^2}{2\sigma^2}}$$

3σ=a length of the overlapping portion;

images photographed by any two cameras are processed according to a similar method, so that a texture mapping problem of a single circle model is resolved; and for all approximate circles in the three-dimensional finger model, grayscale values of three-dimensional coordinate points are calculated separately according to the foregoing methods, to eventually obtain the three-dimensional finger vein image.

6. The three-dimensional finger vein recognition method according to claim 1, wherein two three-dimensional finger vein texture images that need to be matched are aligned first, and are separately unfolded into two-dimensional images, and matching of a three-dimensional finger vein texture is then completed by using feature extraction and matching of the unfolded two-dimensional images.

7. The three-dimensional finger vein recognition method according to claim 6, wherein unfolding the three-dimensional finger vein texture images into a two-dimensional image comprises:

first, mapping a three-dimensional finger vein texture onto a cylinder having a given size, wherein this is equivalent to that each circle is normalized into a circle having a fixed size, for a circle model, equal-angle sampling is performed starting from a first point in a horizontal direction, a total of N points are sampled, and each point is mapped to a point at a same angle on a circle at a corresponding position of the cylinder:

$$I(r\times\cos(\tilde{x}\alpha), r\times\sin(\tilde{x}\alpha), z) = I(r\times\cos(\tilde{x}\alpha) + x_c, r_c\times\sin(\tilde{x}\alpha) + y_c, z)$$

wherein $\alpha = 2\pi/N$, $\tilde{x}=1, 2, 3, \ldots, N$, $z=1, 2, \ldots, M$ and z-axis coordinates, r is the radius of the given cylinder, $r_c$ is the radius of a circle model during three-dimensional finger vein reconstruction, and $(x_c,y_c)$ is the centre position of the circle model; and a vein texture can be mapped onto the side of the cylinder after all circle models are processed; and the side of the cylinder is cut open along one generatrix according to the following Formula 1, and is unfolded into a two-dimensional image having a size M×N:

$$I(\tilde{x},\tilde{y})=I(r\times\cos(\tilde{x}\alpha-\beta),r\times\sin(\tilde{x}\alpha-\beta),\tilde{y})$$

wherein β denotes the azimuth at which the generatrix is located.

8. The three-dimensional finger vein recognition method according to claim 7, wherein when a cylinder corresponding to a template image and a cylinder corresponding to an image to be matched are unfolded into two-dimensional images, if positions of generatrices do not correspond, there is an offset problem between the two unfolded images, and to ensure that corresponding positions can be kept basically unchanged after samples that belong to a same type of object are unfolded into two-dimensional images, the following method is provided to align three-dimensional finger vein images, that is, a value of β is determined:

substituting $\beta=k\beta_0$ into the foregoing formula, wherein $\beta_0$ is a search step size and is $\pi/15$, $0 \leq k < 2\pi/\beta_0$, and k is an integer; and capturing a two-dimensional image $I_{test}^k$ whose size is $M_0 \times N_0$ from a two-dimensional image unfolded from a three-dimensional image to be matched, wherein $M_0 = \frac{1}{3} \times M$, and $N_0 = \frac{1}{3} \times N$;

here, specifying that a rotational angle of a template three-dimensional finger image is β=0, that is, specifying that a position of a generatrix for unfolding into a two-dimensional image is a reference orientation, and obtaining a sub image block of a two-dimensional image unfolded from a three-dimensional finger vein template image:

$$0 \leq \tilde{x} < M_0$$

$$0 \leq \tilde{y} < N_0$$

wherein a two-dimensional image $I_{template}$ whose size is $M_0 \times N_0$ is obtained, so as to find, from the three-dimensional image to be matched, an image block matching the two-dimensional image, to align the three-dimensional image to be matched and a template three-dimensional image;

then calculating similarity degrees between all two-dimensional images corresponding to k and a template block $I_{template}$:

$$\max_{k \in [0, 2\pi/\beta_0)} J(k) = \text{corr}(I_{template}, I_{test}^k)$$

wherein the foregoing expression corr denotes calculation of a correlation between two images, and $k\beta_0$ corresponding to a maximum correlation is used as a rotational angle of a sample to be matched;

after the azimuth angle of the generatrix is calculated by using this method, then unfolding the three-dimensional finger vein image to be matched into a two-dimensional texture image according to Formula 1, wherein the two-dimensional texture image is aligned with a template two-dimensional image.

9. A three-dimensional finger vein recognition system based on the method according to claim 1, comprising a host and a client, wherein the client comprises a light source control module and an image collection module, the light source control module comprises a microprocessor, a driving circuit, and a near-infrared light source that are sequentially connected, and the image collection module comprises a camera for collecting an image; and wherein a software for implementing three-dimensional finger vein reconstruction and recognition is installed on the host, and the host implements transfer of a light-source brightness control signal with the microprocessor of the light source control module and implements transmission of video data with the camera; and the client is responsible for controlling the intensity of the near-infrared light source and collecting and transmitting image information, and the host is responsible for performing processing, three-dimensional reconstruction, feature extraction, and recognition on collected digital images.

* * * * *